(12) United States Patent
Floyd et al.

(10) Patent No.: US 11,526,847 B2
(45) Date of Patent: Dec. 13, 2022

(54) RECONFIGURING A VEHICLE FOR TRANSFER FROM A FIRST OPERATOR TO A SECOND OPERATOR

(71) Applicant: THE BOEING COMPANY, Chicago, IL (US)

(72) Inventors: Joseph F. Floyd, University Place, WA (US); Brent L. Hadley, Kent, WA (US); Patrick J. Eames, Newcastle, WA (US); Robert J. Martin, Seattle, WA (US)

(73) Assignee: The Boeing Company, Chicago, IL (US)

(*) Notice: Subject to any disclaimer, the term of this patent is extended or adjusted under 35 U.S.C. 154(b) by 476 days.

(21) Appl. No.: 16/718,615

(22) Filed: Dec. 18, 2019

(65) Prior Publication Data
US 2021/0192449 A1    Jun. 24, 2021

(51) Int. Cl.
| | | |
|---|---|---|
| *G06F 16/23* | (2019.01) | |
| *G06Q 10/08* | (2012.01) | |
| *G06Q 10/00* | (2012.01) | |
| *B64F 5/60* | (2017.01) | |
| *B64F 5/40* | (2017.01) | |
| *G06F 16/28* | (2019.01) | |
| *G06F 3/048* | (2013.01) | |

(52) U.S. Cl.
CPC .......... *G06Q 10/0875* (2013.01); *B64F 5/60* (2017.01); *G06Q 10/20* (2013.01); *B64F 5/40* (2017.01); *G06F 3/048* (2013.01); *G06F 16/2322* (2019.01); *G06F 16/28* (2019.01); *G09G 2370/022* (2013.01)

(58) Field of Classification Search
CPC ...................................................... G06F 16/28
See application file for complete search history.

(56) References Cited

U.S. PATENT DOCUMENTS

| | | |
|---|---|---|
| 9,904,896 B2 | 2/2018 | Cowart et al. |
| 10,364,049 B2 * | 7/2019 | Floyd ........................ B64F 5/40 |
| 2011/0087513 A1 | 4/2011 | Floyd et al. |
| 2015/0100571 A1 | 4/2015 | Floyd et al. |
| 2018/0101996 A1 | 4/2018 | Marais et al. |
| 2019/0102810 A1 | 4/2019 | Floyd et al. |

* cited by examiner

*Primary Examiner* — Baoquoc N To
(74) *Attorney, Agent, or Firm* — Womble Bond Dickinson (US) LLP (57) ABSTRACT

A method is provided for reconfiguring a vehicle for transfer from a first operator to a second operator. The method includes accessing first datasets that define an initial configuration of the vehicle, importing second datasets that describe maintenance, repair or service of the vehicle during in-service operation with the first operator, and generating a first composite dataset defining a current configuration of the vehicle. The method also includes accessing third datasets that define requirements of the vehicle for in-service operation with the second operator, and generating a second composite dataset that defines a target configuration of the vehicle from the first composite dataset and based on data of the third datasets. The method includes comparing the first and second composite datasets to identify modifications to reconfigure the vehicle from the current configuration to the target configuration, and generating a visual presentation of the modifications to facilitate reconfiguration of the vehicle.

20 Claims, 6 Drawing Sheets

RECONFIGURING A VEHICLE FOR TRANSFER FROM A FIRST OPERATOR TO A SECOND OPERATOR

CROSS-REFERENCE TO RELATED APPLICATION(S)

The present application is related to U.S. patent application Ser. No. 15/839,933, entitled: Supporting Maintenance of Aircraft, filed Dec. 13, 2017, now U.S. Pat. No. 10,364,049, issued Jul. 30, 2019, the content of which is incorporated herein by reference in its entirety.

TECHNOLOGICAL FIELD

The present disclosure relates generally to reconfiguring a vehicle for transfer from a first operator to a second operator and, in particular, to autonomous generation of a transition plan with modifications to reconfigure a vehicle for transfer.

BACKGROUND

Approximately half of all commercial large transport aircraft in the world are leased by airlines from aircraft leasing companies. Most of these leased airplanes will at some point be returned to the leasing companies and then leased and re-delivered to different airlines. An airplane may be leased and operated by multiple airlines during its economic life. It can be very expensive to transfer an airplane at the end of lease from one airline to a different airline.

World-wide, there are over 150 civil aviation authorities with thousands of regulatory variations, and these differences frequently affect airplane configuration requirements when aircraft are transferred to an airline operating under a different regulatory authority. Frequently, a regulatory jurisdiction will have slightly different operating rules/requirements than another jurisdiction which can necessitate modifications to an airplane before it can be operated by a different airline under their local regulatory jurisdiction. Differences in operating procedures between airlines can also necessitate modifications to an airplane prior to being operated by a different airline. For example, operating in reduced vertical separation minimum (RVSM) airspace can necessitate changes to aircraft hardware, on-board software and also require additional special documentation for an airplane which was not previously operated in RVSM airspace. Also, airlines schedule maintenance tasks differently, which often necessitates the creation of a bridging maintenance program schedule in order to transition the airplane to the preferred maintenance schedule of the new airline operator.

Transferring an aircraft between airlines at the end of lease can cost several million dollars and take several months because of differences in the way the airplane is operated and because of variations in regulations between civil aviation authorities. Therefore, it would be desirable to have a system and method that takes into account at least some of the issues discussed above, as well as other possible issues.

BRIEF SUMMARY

Example implementations of the present disclosure are directed to reconfiguring a vehicle such as an aircraft for transfer from a first operator to a second operator and, in particular, to autonomous generation of a transition plan with modifications to reconfigure a vehicle for transfer. Example implementations may generate a transition plan that includes modifications to reconfigure the vehicle, and may also include a bridging maintenance program schedule to transition from the current maintenance program schedule to the target maintenance program schedule. Some example implementations use genetic algorithms to import datasets from which a current configuration of the vehicle may be defined. Additionally or alternatively, some examples use a genetic algorithm to transition between program schedules.

The present disclosure thus includes, without limitation, the following example implementations.

Some example implementations provide a method of reconfiguring a vehicle for transfer from a first operator to a second operator, the method comprising: accessing first datasets that define an initial configuration of the vehicle as delivered to the first operator; importing second datasets that describe maintenance, repair or service of the vehicle during in-service operation with the first operator, importing the second datasets including for a second dataset of the second datasets: applying an electronic document to a parser configured to use a genetic algorithm to extract, from the electronic document, successive generations of data related to maintenance, repair or service of the vehicle, the successive generations of data having respective measures of fitness; and selecting a generation of the successive generations of data for the second dataset based on a highest of the respective measures of fitness; generating, and storing in a first database, a first composite dataset including data of the first datasets and the second datasets, the first composite dataset defining a current configuration of the vehicle; accessing third datasets that define requirements of the vehicle for in-service operation with the second operator; generating, and storing in a second database, a second composite dataset from the first composite dataset and based on data of the third datasets, the second composite dataset defining a target configuration of the vehicle for delivery to the second operator; comparing the first composite dataset and the second composite dataset to identify modifications to reconfigure the vehicle from the current configuration to the target configuration; and generating a visual presentation of the modifications to facilitate reconfiguration of the vehicle.

In some example implementations of the method of any preceding example implementation, or any combination of any preceding example implementations, accessing the first datasets includes accessing (a) an engineering bill of materials defining the vehicle as designed, (b) a manufacturing bill of materials defining the vehicle as manufactured, (c) a readiness log with a list of serialized parts installed on the vehicle, and (d) any service bulletins that reflect maintenance, repair or service of the vehicle before delivery to the first operator.

In some example implementations of the method of any preceding example implementation, or any combination of any preceding example implementations, the second datasets include different types of data that describe maintenance, repair or service of the vehicle, and importing the second datasets includes applying electronic documents to parsers configured to use respective genetic algorithms for the different types of data.

In some example implementations of the method of any preceding example implementation, or any combination of any preceding example implementations, importing the second datasets includes importing (a) task cards defining maintenance tasks performed on the vehicle, and (b) a current maintenance program schedule of the maintenance tasks performed on the vehicle, and maintenance tasks that are planned.

In some example implementations of the method of any preceding example implementation, or any combination of any preceding example implementations, accessing the third datasets includes accessing (a) requirements of the second operator, and (b) any requirements of a regulatory agency to which the second operator is subject.

In some example implementations of the method of any preceding example implementation, or any combination of any preceding example implementations, the regulatory agency is a second regulatory agency, and the first composite dataset that defines the current configuration of the vehicle reflects requirements of a first regulatory agency to which the first operator is subject, the requirements of the second regulatory agency including one or more requirements that differ from the requirements of the first regulatory agency.

In some example implementations of the method of any preceding example implementation, or any combination of any preceding example implementations, importing the second datasets includes importing a current maintenance program schedule of maintenance tasks performed on the vehicle, and maintenance tasks that are planned for the vehicle in the current configuration, wherein accessing the third datasets includes accessing a target maintenance program schedule of maintenance tasks that are planned for the vehicle in the target configuration, and wherein the method further comprises generating a bridging maintenance program schedule to transition from the current maintenance program schedule to the target maintenance program schedule.

In some example implementations of the method of any preceding example implementation, or any combination of any preceding example implementations, generating the bridging maintenance program schedule includes: applying the current maintenance program schedule and the target maintenance program schedule to a maintenance bridging engine configured to use a second genetic algorithm to generate successive generations of a solution to transition from the current maintenance program schedule to the target maintenance program schedule, the successive generations of the solution having respective measures of fitness; and selecting a generation of the successive generations of the solution as the bridging maintenance program schedule based on a highest of the respective measures of fitness.

In some example implementations of the method of any preceding example implementation, or any combination of any preceding example implementations, the method further comprises reconfiguring the vehicle according to the modifications.

Some example implementations provide an apparatus for reconfiguring a vehicle for transfer from a first operator to a second operator, the apparatus comprising: a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for reconfiguring a vehicle for transfer from a first operator to a second operator, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout.

Example implementations of the present disclosure relate generally to reconfiguring a vehicle for transfer from a first operator to a second operator and, in particular, to autonomous generation of a transition plan with modifications to reconfigure a vehicle for transfer. Example implementations will be primarily described in conjunction with aircraft, but it should be understood that example implementations may be utilized in conjunction with a variety of other vehicles. Examples of suitable vehicles that may benefit from example implementations include spacecraft, watercraft, motor vehicles, railed vehicles and the like. Furthermore, it should be understood that unless otherwise specified, the terms "data," "content," "digital content," "information," and similar terms may be at times used interchangeably.

Figure 1:
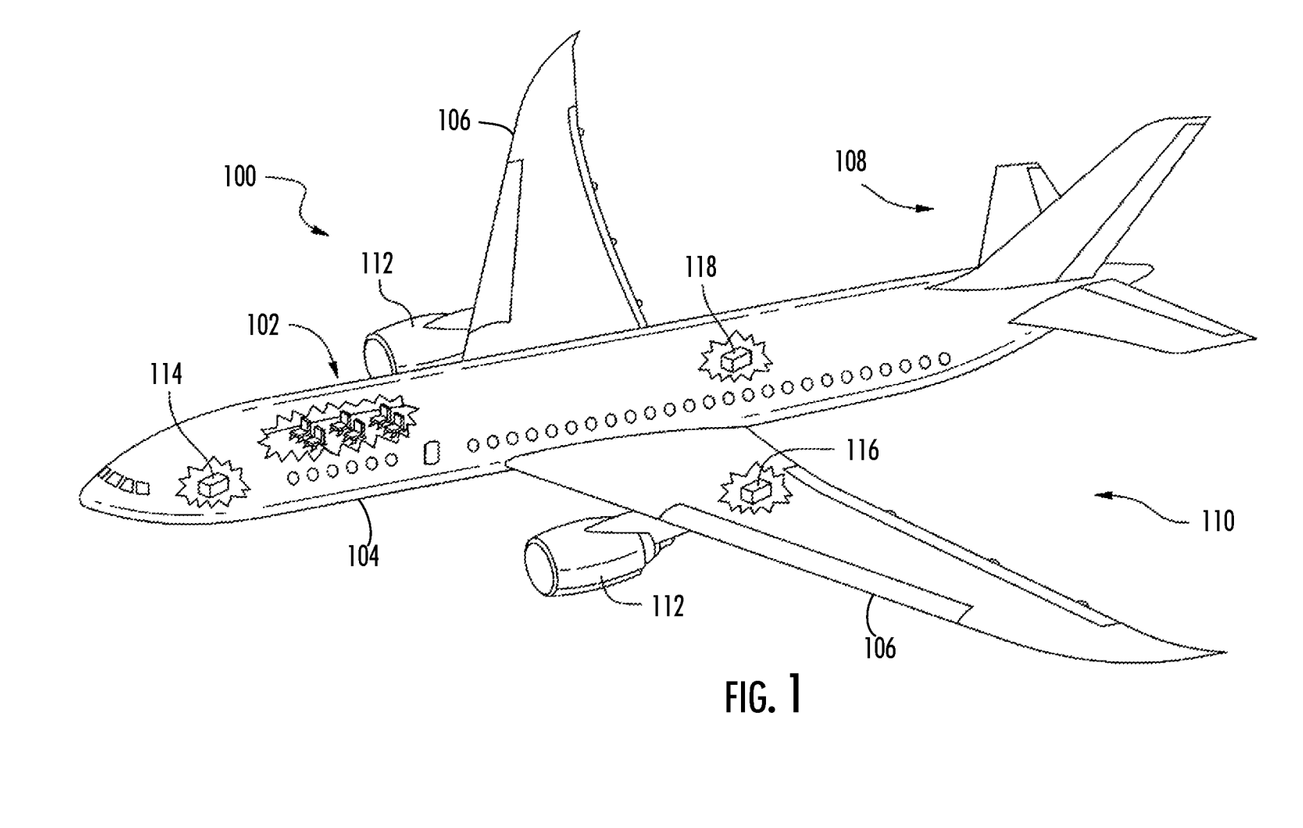
FIG. 1 illustrates an aircraft according to some example implementations of the present disclosure.

FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
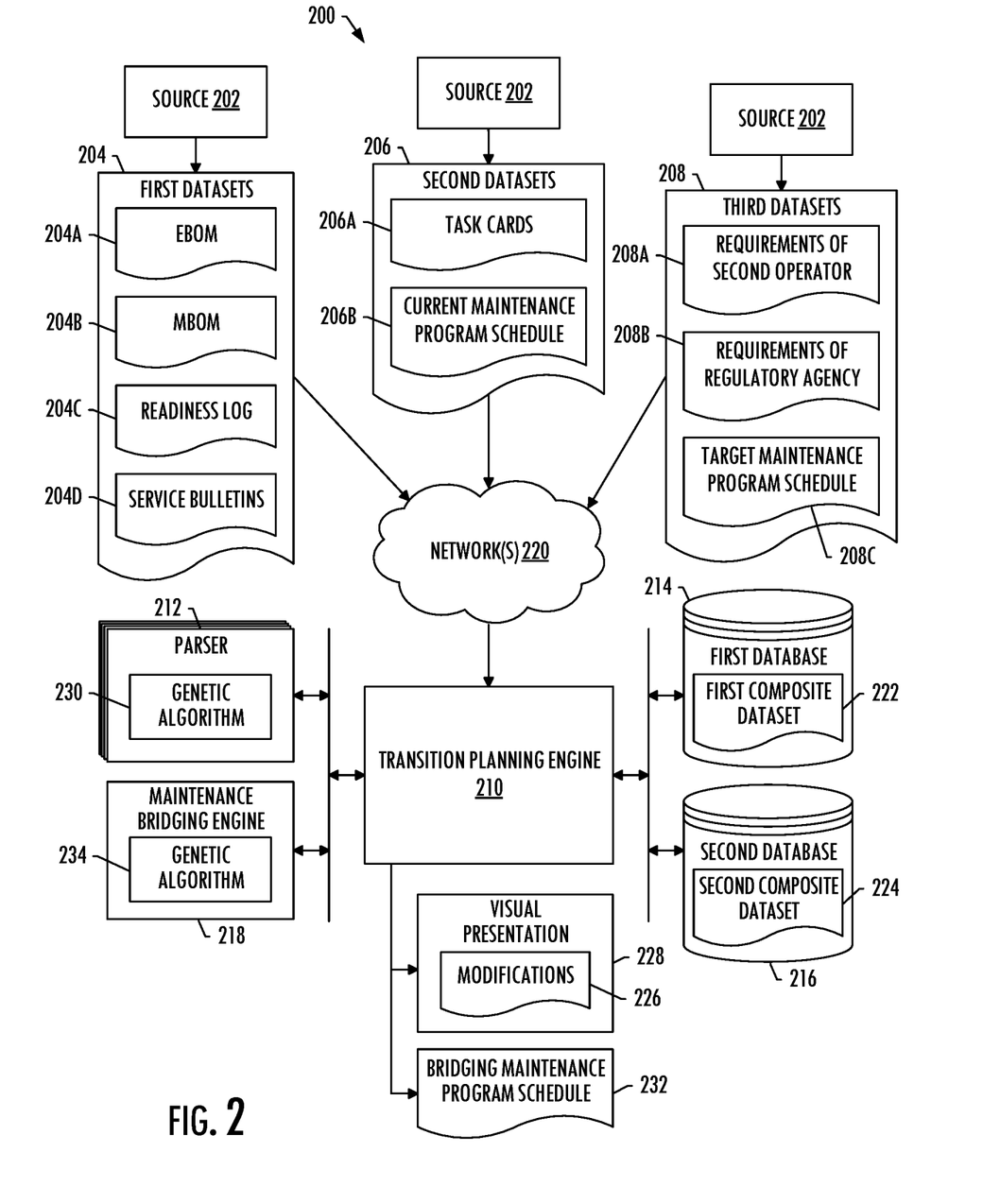
FIG. 2 illustrates a system for reconfiguring a vehicle such as an aircraft for transfer from a first operator to a second operator, according to some example implementations.

FIG. 2 illustrates a system 200 for reconfiguring a vehicle such as aircraft 100 for transfer from a first operator to a second operator, according to some example implementations. The system may include any of a number of different subsystems (each an individual system) for performing one or more functions or operations. As shown, in some examples, the system includes at least one source 202 of data. In some examples, the source includes a memory that may be located at a single source or distributed across multiple sources. The data may be stored in a number of different manners, such as in a database or flat files of any of a number of different types or formats.

In some examples, the data includes first datasets 204, second datasets 206 and third datasets 208. The first datasets define an initial configuration of the vehicle as delivered to the first operator. This may include, for example, an engineering bill of materials (EBOM) 204A defining the vehicle as designed, a manufacturing bill of materials (MBOM) 204B defining the vehicle as manufactured, a readiness log 204C with a list of serialized parts installed on the vehicle, any service bulletins 204D that reflect maintenance, repair or service of the vehicle before delivery to the first operator, and the like.

The second datasets 206 describe maintenance, repair or service of the vehicle during in-service operation with the first operator, such as task cards 206A defining maintenance tasks performed on the vehicle, and a current maintenance program schedule 206B of the maintenance tasks performed on the vehicle, and maintenance tasks that are planned. Third datasets 208 define requirements of the vehicle for in-service operation with the second operator, such as requirements 208A of the second operator, and any requirements 208B of a regulatory agency to which the second operator is subject. In some examples, the third datasets include a target maintenance program schedule 208C of maintenance tasks that are planned for the vehicle in a target configuration.

The system 200 of example implementations of the present disclosure includes a transition planning engine 210, a parser 212, a first database 214, a second database 216, and/or a maintenance bridging engine 218 generally configured to generate a transition plan with modifications to reconfigure the vehicle for transfer from the first operator to the second operator. The at least one source 202 of data and these other subsystems may be co-located or directly coupled to one another, or in some examples, various ones of the subsystems may communicate with one another across one or more computer networks 220. Further, although shown as part of the system, it should be understood that any one or more of the above may function or operate as a separate system without regard to any of the other subsystems. It should also be understood that the system may include one or more additional or alternative subsystems than those shown in FIG. 2.

According to some example implementations of the present disclosure, the transition planning engine 210 is configured to access the first datasets 204 that define an initial configuration of the vehicle as delivered to the first operator, and import the second datasets 206 that describe maintenance, repair or service of the vehicle during in-service operation with the first operator. The transition planning engine is configured to generate, and store in the first database 214, a first composite dataset 222 including data of the first datasets and the second datasets. The first composite dataset 222 defines a current configuration of the vehicle, which may reflect requirements of a first regulatory agency to which the first operator is subject. In some examples in which the third datasets 208 include requirements 208B of the regulatory agency to which the second operator is subject, this regulatory agency is a second regulatory agency, and the requirements of the second regulatory agency include one or more requirements that differ from the requirements of the first regulatory agency.

The transition planning engine 210 is configured to access the third datasets 208 that define requirements of the vehicle for in-service operation with the second operator, and generate, and store in the second database 216, a second composite dataset 224 from the first composite dataset 222 and based on data of the third datasets. The second composite dataset defines a target configuration of the vehicle for delivery to the second operator.

The transition planning engine 210 is configured to compare the first composite dataset 222 and the second composite dataset 224 to identify modifications 226 to reconfigure the vehicle from the current configuration to the target configuration. The transition planning engine is configured to generate a visual presentation 228 of the modifications to facilitate reconfiguration of the vehicle.

According to some example implementations, the second datasets 206 include records of maintenance, repair or service with structured or unstructured (e.g., free-form) data, and these records may be contained in electronic documents of a number of different formats, and records of the same type may be contained in electronic documents of different formats. Examples of suitable formats include text-based formats (e.g., ANS, ASC, DOC, DOCX, HTML, PDF, RTF, TXT, WPD), presentation formats (e.g., PDP, PPT), spreadsheet formats (e.g., XLS) and the like. As the second datasets may be reflected in different formats, the parser in some examples may employ a genetic algorithm to parse an electronic document for data related to maintenance, repair or service of the vehicle.

In some examples, then, importation of the second datasets 206 includes the transition planning engine 210 configured to apply an electronic document such as a task card of the task cards 206A to the parser 212. The parser is configured to use a genetic algorithm 230 to extract, from the electronic document, successive generations of data related to maintenance, repair or service of the vehicle. The successive generations of data have respective measures of fitness, and the parser is configured to select a generation of the successive generations of data for the second dataset based on a highest of the respective measures of fitness. An example of a suitable measure of fitness or completeness may be when an expected number of task cards is found. In this regard, an operator's maintenance program may inform which task cards must be accomplished by a given age of the vehicle, a known. The operator cannot deviate significantly from this. Example implementations may iterate until this number of task cards is found. In some further examples, the second datasets include different types of data that describe maintenance, repair or service of the vehicle. In some of these examples, the parser is configured to apply electronic documents to parsers configured to use respective genetic algorithms for the different types of data.

As indicated above, in some examples, the second datasets 206 include a current maintenance program schedule 206B. A maintenance program schedule provides dates by which each particular system, sub-system, component, part or the like of the vehicle is to be serviced (such as through inspection, part servicing, part replacement, and/or the like). The maintenance program schedule specifies intervals indicating when each maintenance task is to be completed (in terms of calendar days, flight hours and/or flight cycles) in order to ensure that the aircraft is airworthy. The maintenance program schedule specifies dates when specific tasks are planned.

The second operator to which the vehicle is transferred may prefer a different maintenance program schedule; and accordingly, in some examples, the third datasets 208 include a target maintenance program schedule 208C. In some of these examples, the transition planning engine 210 is configured to import the current maintenance program schedule, access the target maintenance program schedule, and generate a bridging maintenance program schedule 232 to transition from the current maintenance program schedule to the target maintenance program schedule. The bridging maintenance program schedule may provide one or more transition dates over a transition period during which maintenance tasks in the current maintenance program schedule falling due within the transition period are to be completed.

In some further examples, the transition planning engine 210 is configured to apply the current maintenance program schedule 206B and the target maintenance program schedule 208C to the maintenance bridging engine 218. The maintenance bridging engine is configured to use a (second) genetic algorithm 234 to generate successive generations of a solution to transition from the current maintenance program schedule to the target maintenance program schedule. The successive generations of the solution have respective measures of fitness, and the transition planning engine is configured to select a generation of the successive generations of the solution as the bridging maintenance program schedule 232 based on a highest of the respective measures of fitness. An example of a suitable measure of fitness may be cost. Example implementations may seek to minimize cost of the transition. This measure of fitness may involve minimizing down time of the vehicle, less out-of-service time, but may also involve maximizing reuse of various maintenance practices (e.g., only open an access panel once if possible). Example implementations may also take into account labor rates, which may vary based on various factors such as time of year, geography and the like.

In some examples, a suitable measure of fitness for maintenance tasks to complete on a transition date may include locations on the aircraft at which the maintenance tasks are performed, those located in the same general area of the vehicle having a higher measure of fitness. For example, it is smart planning to perform corrosion inspections and other visual inspections in the forward lower cargo area of an aircraft at the same time. That way, the second operator does not have to open up that area for inspection (e.g., remove all the cargo liners and insulation blankets) again when the next phased maintenance check is performed. The system 200 may therefore associate the locations of the maintenance task card inspections (and other maintenance and modification activities) along with required calendar days, flight hours and/or flight cycles, to minimize the amount of labor and time required to open up all the areas for the inspections (or not have to re-open the area at a later maintenance check to perform just one or two inspections).

Another example of a suitable measure of fitness may be those maintenance tasks that can be on the same transition date. For example, scheduling landing gear overhauls involves shoring the aircraft, removing the landing gear, installing the replacement landing gear, performing functional tests ("gear-swings"). This may require a significant amount of flow-time; and accordingly, it may be desirable to schedule while the aircraft is down for maintenance for a fairly long time. The system 200 of some examples may learn these types of "rules" in order to make the best recommendations to minimize aircraft down-time for scheduled maintenance and minimize labor hours.

To further illustrate this bridging, consider a particular example in which the current maintenance program schedule 206B specifies or otherwise indicates the aircraft's age in calendar days, flight hours and/or flight cycles. Additionally, the current maintenance program schedule may specify or otherwise indicate maintenance task identifiers, last date (in terms of calendar days, flight hours and/or flight cycles) that each maintenance task was completed, next scheduled date for each maintenance task, age of life-limited parts, and any regulatory agency airworthiness directive (AD) requirements that have been met and when those requirements were met. A target maintenance program schedule 208C may specify or otherwise indicate projected aircraft usage (in terms of flight hours and/or flight cycles per day), desired dates for scheduled maintenance visits and maintenance tasks for each maintenance visit.

The maintenance bridging engine may use the (second) genetic algorithm 234 to compare the next scheduled date for each maintenance task, with the desired dates for scheduled maintenance visits and the maintenance tasks for each maintenance visit, to ensure the desired date for each maintenance task does not exceed the next scheduled date. The genetic algorithm may propose dates and maintenance tasks for transition dates, and may propose alternative dates and maintenance tasks to be performed on those dates.

The second operator may iteratively revise the target maintenance program schedule 208C, and resulting bridging maintenance program schedule 232, until the second operator is satisfied with the bridging maintenance program schedule that is a final bridging maintenance program schedule. In some examples, the system 200 may retain details of this in order to compare the initial algorithm-proposed bridging maintenance program schedule and the final bridging maintenance program schedule, and adjust genetic algorithm to generate similar final results based on subsequent initial inputs.

Figure 3A:
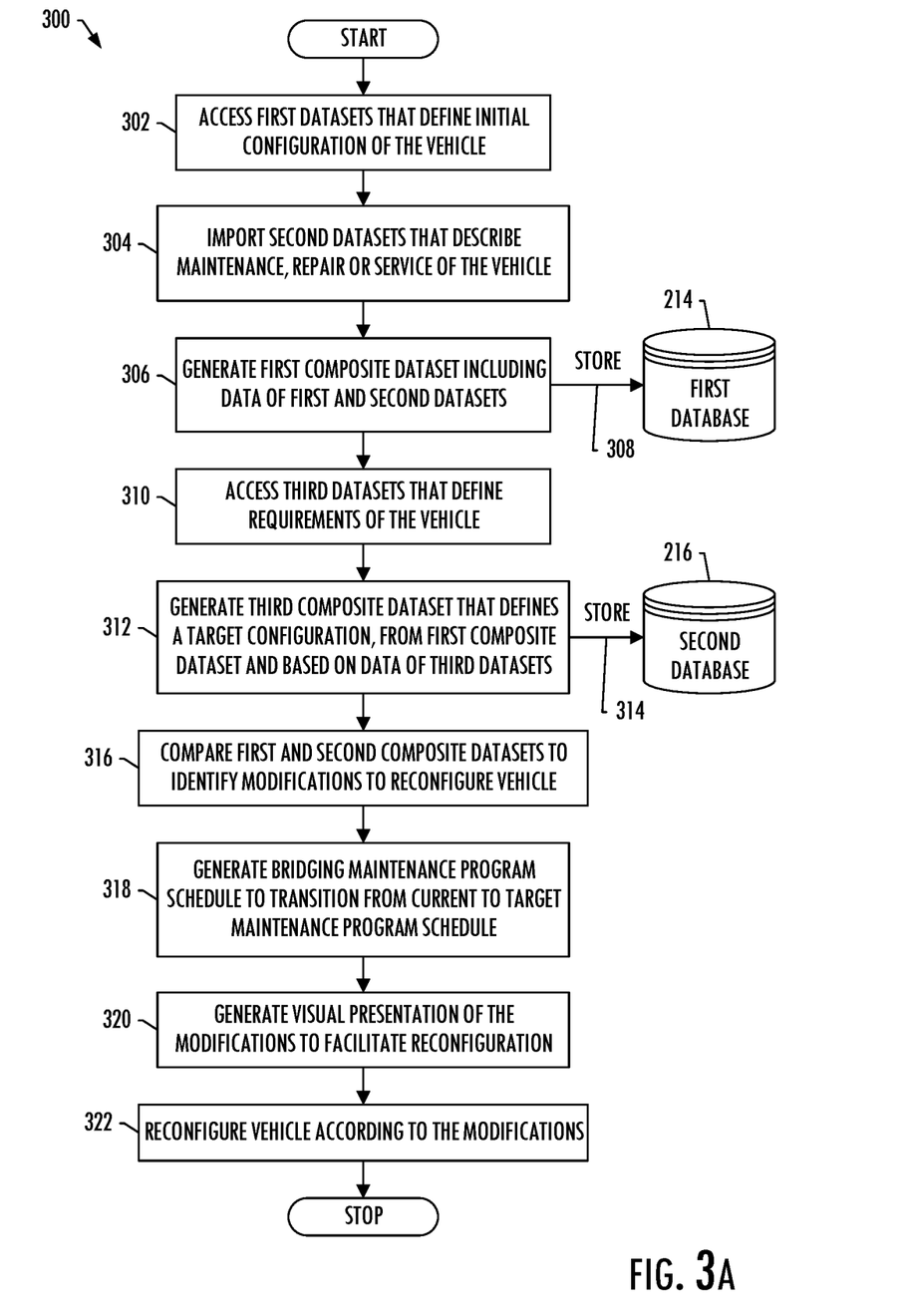
FIGS. 3A, 3B and 3C are flowcharts illustrating various operations in a method of reconfiguring a vehicle for transfer from a first operator to a second operator, according to some example implementations.
Figure 3B:
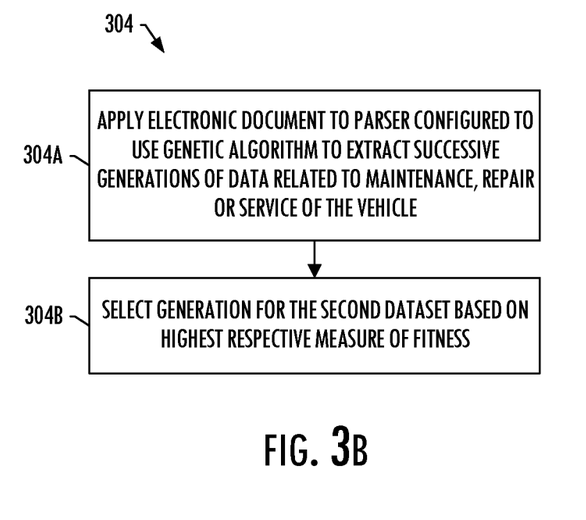
Figure 3C:
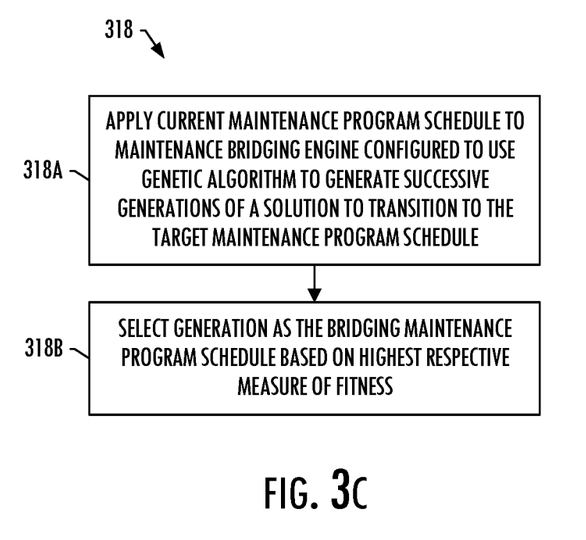

FIGS. 3A, 3B and 3C are flowcharts illustrating various operations in a method 300 of reconfiguring a vehicle for transfer from a first operator to a second operator, according to example implementations of the present disclosure. As shown at blocks 302 and 304 of FIG. 3A, the method includes accessing first datasets 204 that define an initial configuration of the vehicle as delivered to the first operator, and importing second datasets 206 that describe maintenance, repair or service of the vehicle during in-service operation with the first operator. The method includes generating, and storing in a first database 214, a first composite dataset 222 including data of the first datasets and the second datasets, the first composite dataset defining a current configuration of the vehicle, as shown at blocks 306 and 308.

The method 300 includes accessing third datasets 208 that define requirements of the vehicle for in-service operation with the second operator, as shown at block 310. The method includes generating, and storing in a second database 216, a second composite dataset 224 from the first composite dataset 222 and based on data of the third datasets, the second composite dataset defining a target configuration of the vehicle for delivery to the second operator, as shown at blocks 312 and 314. The method includes comparing the first composite dataset and the second composite dataset to identify modifications 226 to reconfigure the vehicle from the current configuration to the target configuration, as shown at block 316.

In some examples, importing (at block 304) the second datasets 206 includes importing a current maintenance program schedule 206B of maintenance tasks performed on the vehicle, and maintenance tasks that are planned for the vehicle in the current configuration. In some of these examples, accessing (at block 310) the third datasets 208 includes accessing a target maintenance program schedule 208C of maintenance tasks that are planned for the vehicle in the target configuration. In some of these examples, the method further comprises generating a bridging maintenance program schedule 232 to transition from the current maintenance program schedule to the target maintenance program schedule, as shown at block 318.

As shown at block 320, the method includes generating a visual presentation 228 of the modifications 226 to facilitate reconfiguration of the vehicle. As shown at block 322, in some examples, the method further comprises reconfiguring the vehicle according to the modifications.

FIG. 3B illustrates in particular importing (at block 304) the second datasets 206 for a second dataset, according to some example implementations. As shown at block 304A, importing the second datasets includes applying an electronic document to a parser 212 configured to use a genetic algorithm 230 to extract, from the electronic document, successive generations of data related to maintenance, repair or service of the vehicle. The successive generations of data have respective measures of fitness, and a generation of the successive generations of data is selected for the second dataset based on a highest of the respective measures of fitness, as shown at block 304B.

FIG. 3C illustrates in particular generating (at block 318) the bridging maintenance program schedule 232, according to some example implementations. As shown at block 318A, generating the bridging maintenance program schedule includes applying the current maintenance program schedule 206B and the target maintenance program schedule 208C to a maintenance bridging engine 218 configured to use a second genetic algorithm 234 to generate successive generations of a solution to transition from the current maintenance program schedule to the target maintenance program schedule. The successive generations of the solution have respective measures of fitness, and a generation of the successive generations of the solution is selected as the bridging maintenance program schedule based on a highest of the respective measures of fitness, as shown at block 318B.

According to example implementations of the present disclosure, the system 100 and its subsystems including the source 202, transition planning engine 210, a parser 212, a first database 214, a second database 216, and/or a maintenance bridging engine 218 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
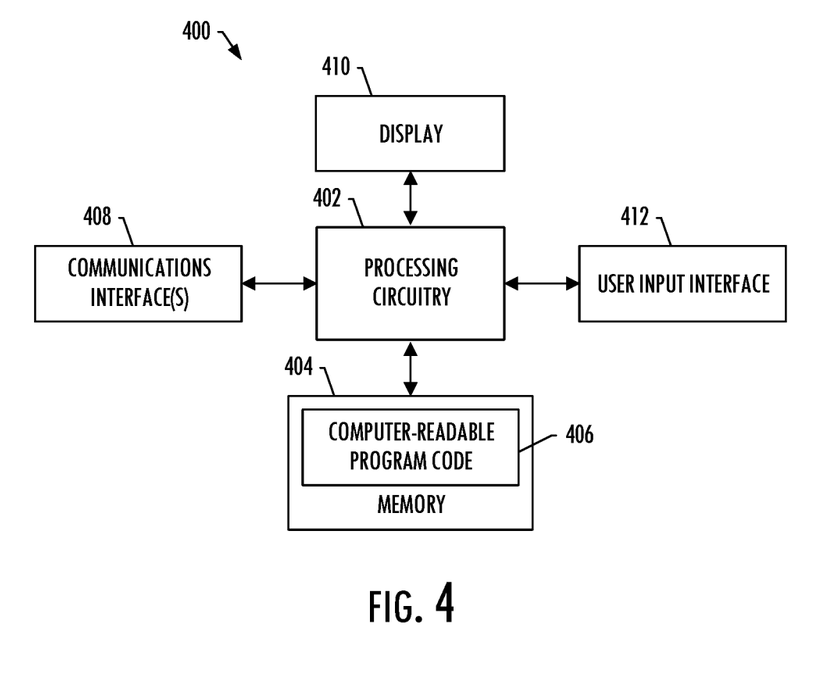
FIG. 4 illustrates an apparatus according to some example implementations.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above, example implementations of the present disclosure may be suitable for reconfiguring any of a number of different vehicles including aircraft, spacecraft, watercraft, motor vehicles, railed vehicles and the like. Thus, referring now to FIG. 5, example implementations may be used in the context of an aircraft manufacturing and service method 500. During pre-production, the example method may include specification and design 502 of an aircraft such as aircraft 100, manufacturing sequence and processing planning 504 and material procurement 506. During production, component and subassembly manufacturing 508 and system integration 510 of the aircraft takes place. Thereafter, the aircraft may go through certification and delivery 512 in order to be placed in service 514. While in service by an operator, the aircraft may be scheduled for maintenance and service 516 (which may also include modification, reconfiguration, refurbishment or the like).

Figure 5:
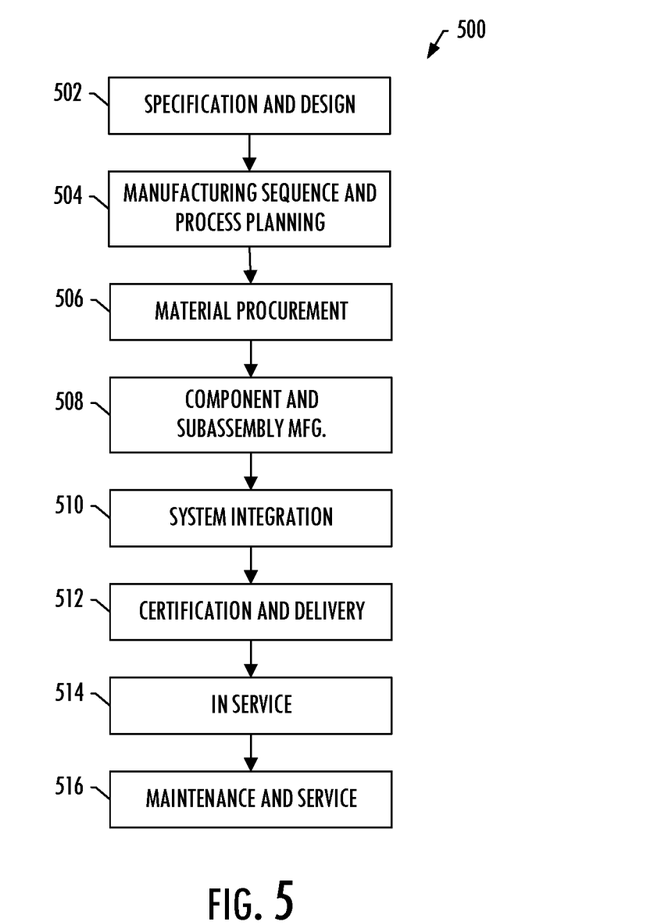
FIG. 5 is an illustration of a flow diagram of aircraft production and service methodology according to one example implementation.

According to example implementations of the present disclosure, the first datasets 204 that define an initial configuration of the aircraft may be generated and collected during preproduction and production of the aircraft, and may extend through certification and delivery 512 of the aircraft to a first operator. This may include, for example, EBOM 204A, MBOM 204B, readiness log 204C and/or service bulletins 204D. Similarly, the second datasets 206 that describe maintenance, repair or service of the vehicle during in-service operation with the first operator may be generated and collected while the aircraft is in service 514, such as during maintenance and service 516.

In some examples, the first operator may lease the aircraft from a leasing company, and return the aircraft on expiration of the lease. The aircraft may then be leased or sold to a second operator. The third datasets 208 that define requirements of the vehicle for in-service operation with the second operator may be generated and collected. A transition plan including modifications 226 to reconfigure the aircraft for transfer, and perhaps a bridging maintenance program schedule 232, may be identified or generated. The aircraft may be reconfigured according to the transition plan, and the aircraft may again go through certification and delivery 512 in order to be placed in service 514 with the second operator.

Each of the processes of the example method 500 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for reconfiguring a vehicle for transfer from a first operator to a second operator, the apparatus comprising:
a memory configured to store computer-readable program code; and
processing circuitry configured to access the memory, and execute the computer-readable program code to cause the apparatus to at least:
access first datasets that define an initial configuration of the vehicle as delivered to the first operator;
import second datasets that describe maintenance, repair or service of the vehicle during in-service operation with the first operator, the apparatus caused to import the second datasets including for a second dataset of the second datasets, the apparatus caused to:
apply an electronic document to a parser executed by the processing circuitry and configured to use a genetic algorithm to extract, from the electronic document, successive generations of data related to maintenance, repair or service of the vehicle, the successive generations of data having respective measures of fitness; and
select a generation of the successive generations of data for the second dataset based on a highest of the respective measures of fitness;
generate, and store in a first database, a first composite dataset including data of the first datasets and the second datasets, the first composite dataset defining a current configuration of the vehicle;
access third datasets that define requirements of the vehicle for in-service operation with the second operator;
generate, and store in a second database, a second composite dataset from the first composite dataset and based on data of the third datasets, the second composite dataset defining a target configuration of the vehicle for delivery to the second operator;
compare the first composite dataset and the second composite dataset to identify modifications to reconfigure the vehicle from the current configuration to the target configuration; and
generate a visual presentation of the modifications to facilitate reconfiguration of the vehicle.

2. The apparatus of claim 1, wherein the apparatus caused to access the first datasets includes the apparatus caused to access (a) an engineering bill of materials defining the vehicle as designed, (b) a manufacturing bill of materials defining the vehicle as manufactured, (c) a readiness log with a list of serialized parts installed on the vehicle, and (d) any service bulletins that reflect maintenance, repair or service of the vehicle before delivery to the first operator.

3. The apparatus of claim 1, wherein the second datasets include different types of data that describe maintenance, repair or service of the vehicle, and the apparatus caused to import the second datasets includes the apparatus caused to apply electronic documents to parsers configured to use respective genetic algorithms for the different types of data.

4. The apparatus of claim 1, wherein the apparatus caused to import the second datasets includes the apparatus caused to import (a) task cards defining maintenance tasks performed on the vehicle, and (b) a current maintenance program schedule of the maintenance tasks performed on the vehicle, and maintenance tasks that are planned.

5. The apparatus of claim 1, wherein the apparatus caused to access the third datasets includes the apparatus caused to access (a) requirements of the second operator, and (b) any requirements of a regulatory agency to which the second operator is subject.

6. The apparatus of claim 5, wherein the regulatory agency is a second regulatory agency, and the first composite dataset that defines the current configuration of the vehicle reflects requirements of a first regulatory agency to which the first operator is subject, the requirements of the second regulatory agency including one or more requirements that differ from the requirements of the first regulatory agency.

7. The apparatus of claim 1, wherein the apparatus caused to import the second datasets includes the apparatus caused to import a current maintenance program schedule of maintenance tasks performed on the vehicle, and maintenance tasks that are planned for the vehicle in the current configuration,
wherein the apparatus caused to access the third datasets includes the apparatus caused to access a target maintenance program schedule of maintenance tasks that are planned for the vehicle in the target configuration, and wherein the processing circuitry is configured to execute the computer-readable program code to cause the apparatus to further generate a bridging maintenance program schedule to transition from the current maintenance program schedule to the target maintenance program schedule.

8. The apparatus of claim 7, wherein the apparatus caused to generate the bridging maintenance program schedule includes the apparatus caused to at least:
  apply the current maintenance program schedule and the target maintenance program schedule to a maintenance bridging engine configured to use a second genetic algorithm to generate successive generations of a solution to transition from the current maintenance program schedule to the target maintenance program schedule, the successive generations of the solution having respective measures of fitness; and
  select a generation of the successive generations of the solution as the bridging maintenance program schedule based on a highest of the respective measures of fitness.

9. A method of reconfiguring a vehicle for transfer from a first operator to a second operator, the method comprising:
  accessing first datasets that define an initial configuration of the vehicle as delivered to the first operator;
  importing second datasets that describe maintenance, repair or service of the vehicle during in-service operation with the first operator, importing the second datasets including for a second dataset of the second datasets:
  applying an electronic document to a parser configured to use a genetic algorithm to extract, from the electronic document, successive generations of data related to maintenance, repair or service of the vehicle, the successive generations of data having respective measures of fitness; and
  selecting a generation of the successive generations of data for the second dataset based on a highest of the respective measures of fitness;
  generating, and storing in a first database, a first composite dataset including data of the first datasets and the second datasets, the first composite dataset defining a current configuration of the vehicle;
  accessing third datasets that define requirements of the vehicle for in-service operation with the second operator;
  generating, and storing in a second database, a second composite dataset from the first composite dataset and based on data of the third datasets, the second composite dataset defining a target configuration of the vehicle for delivery to the second operator;
  comparing the first composite dataset and the second composite dataset to identify modifications to reconfigure the vehicle from the current configuration to the target configuration; and
  generating a visual presentation of the modifications to facilitate reconfiguration of the vehicle.

10. The method of claim 9, wherein accessing the first datasets includes accessing (a) an engineering bill of materials defining the vehicle as designed, (b) a manufacturing bill of materials defining the vehicle as manufactured, (c) a readiness log with a list of serialized parts installed on the vehicle, and (d) any service bulletins that reflect maintenance, repair or service of the vehicle before delivery to the first operator.

11. The method of claim 9, wherein the second datasets include different types of data that describe maintenance, repair or service of the vehicle, and importing the second datasets includes applying electronic documents to parsers configured to use respective genetic algorithms for the different types of data.

12. The method of claim 9, wherein importing the second datasets includes importing (a) task cards defining maintenance tasks performed on the vehicle, and (b) a current maintenance program schedule of the maintenance tasks performed on the vehicle, and maintenance tasks that are planned.

13. The method of claim 9, wherein accessing the third datasets includes accessing (a) requirements of the second operator, and (b) any requirements of a regulatory agency to which the second operator is subject.

14. The method of claim 13, wherein the regulatory agency is a second regulatory agency, and the first composite dataset that defines the current configuration of the vehicle reflects requirements of a first regulatory agency to which the first operator is subject, the requirements of the second regulatory agency including one or more requirements that differ from the requirements of the first regulatory agency.

15. The method of claim 9, wherein importing the second datasets includes importing a current maintenance program schedule of maintenance tasks performed on the vehicle, and maintenance tasks that are planned for the vehicle in the current configuration,
  wherein accessing the third datasets includes accessing a target maintenance program schedule of maintenance tasks that are planned for the vehicle in the target configuration, and
  wherein the method further comprises generating a bridging maintenance program schedule to transition from the current maintenance program schedule to the target maintenance program schedule.

16. The method of claim 15, wherein generating the bridging maintenance program schedule includes:
  applying the current maintenance program schedule and the target maintenance program schedule to a maintenance bridging engine configured to use a second genetic algorithm to generate successive generations of a solution to transition from the current maintenance program schedule to the target maintenance program schedule, the successive generations of the solution having respective measures of fitness; and
  selecting a generation of the successive generations of the solution as the bridging maintenance program schedule based on a highest of the respective measures of fitness.

17. The method of claim 9 further comprising reconfiguring the vehicle according to the modifications.

18. A computer-readable storage medium for reconfiguring a vehicle for transfer from a first operator to a second operator, the computer-readable storage medium being non-transitory and having computer-readable program code stored therein that, in response to execution by processing circuitry, causes an apparatus to at least:
  access first datasets that define an initial configuration of the vehicle as delivered to the first operator;
  import second datasets that describe maintenance, repair or service of the vehicle during in-service operation with the first operator, the apparatus caused to import the second datasets including for a second dataset of the second datasets, the apparatus caused to:
  apply an electronic document to a parser configured to use a genetic algorithm to extract, from the electronic document, successive generations of data related to maintenance, repair or service of the vehicle, the successive generations of data having respective measures of fitness; and select a generation of the successive generations of data for the second dataset based on a highest of the respective measures of fitness;

generate, and store in a first database, a first composite dataset including data of the first datasets and the second datasets, the first composite dataset defining a current configuration of the vehicle;

access third datasets that define requirements of the vehicle for in-service operation with the second operator;

generate, and store in a second database, a second composite dataset from the first composite dataset and based on data of the third datasets, the second composite dataset defining a target configuration of the vehicle for delivery to the second operator;

compare the first composite dataset and the second composite dataset to identify modifications to reconfigure the vehicle from the current configuration to the target configuration; and generate a visual presentation of the modifications to facilitate reconfiguration of the vehicle.

19. The computer-readable storage medium of claim 18, wherein the second datasets include different types of data that describe maintenance, repair or service of the vehicle, and the apparatus caused to import the second datasets includes the apparatus caused to apply electronic documents to parsers configured to use respective genetic algorithms for the different types of data.

20. The computer-readable storage medium of claim 18, wherein the apparatus caused to import the second datasets includes the apparatus caused to import a current maintenance program schedule of maintenance tasks performed on the vehicle, and maintenance tasks that are planned for the vehicle in the current configuration, wherein the apparatus caused to access the third datasets includes the apparatus caused to access a target maintenance program schedule of maintenance tasks that are planned for the vehicle in the target configuration, and wherein the processing circuitry is configured to execute the computer-readable program code to cause the apparatus to further generate a bridging maintenance program schedule to transition from the current maintenance program schedule to the target maintenance program schedule.

* * * * *